Jan. 5, 1965 J. KRUTSCH 3,163,956
FISHLURE DEVICE
Filed Sept. 17, 1962 2 Sheets-Sheet 2
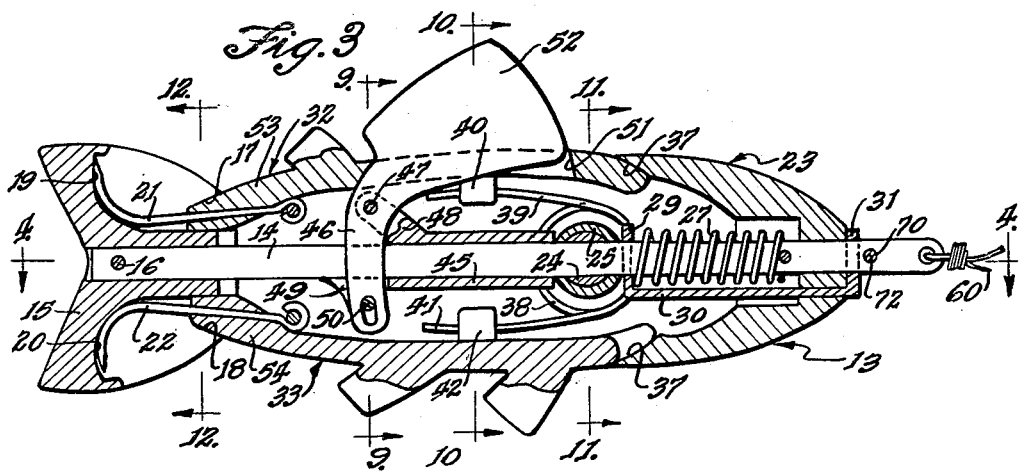
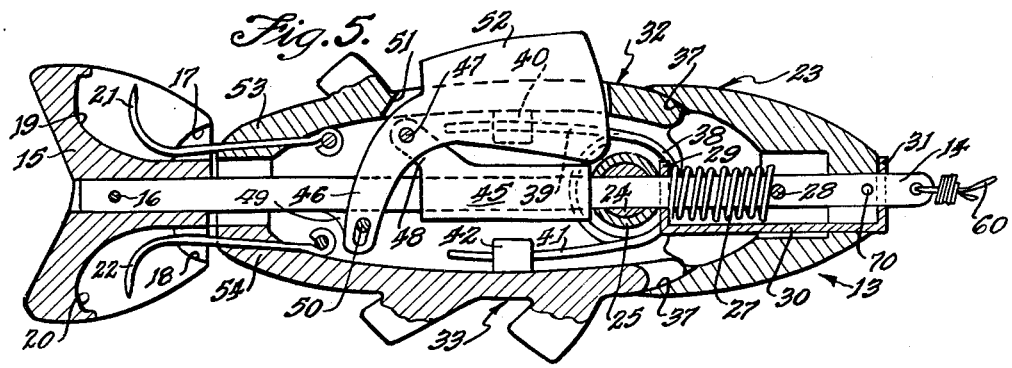
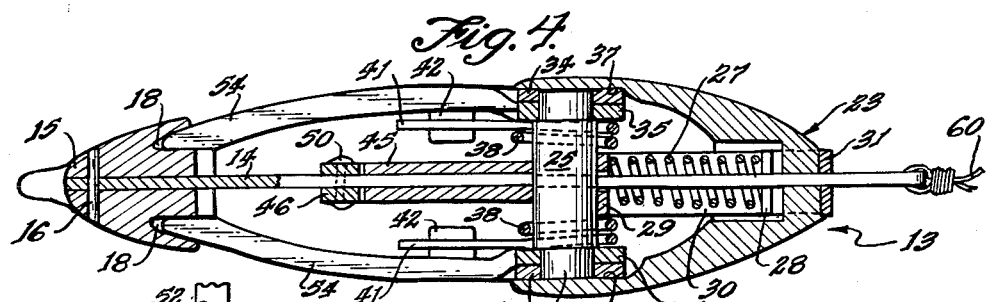
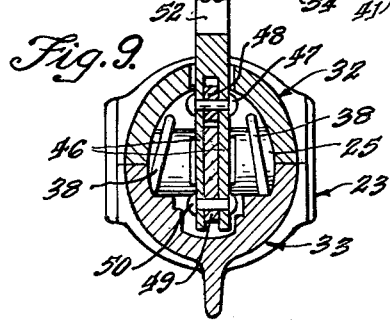
INVENTOR.
John Krutsch
BY
Stone, Nierman,
Burmeister & Zummer
ATTORNEYS

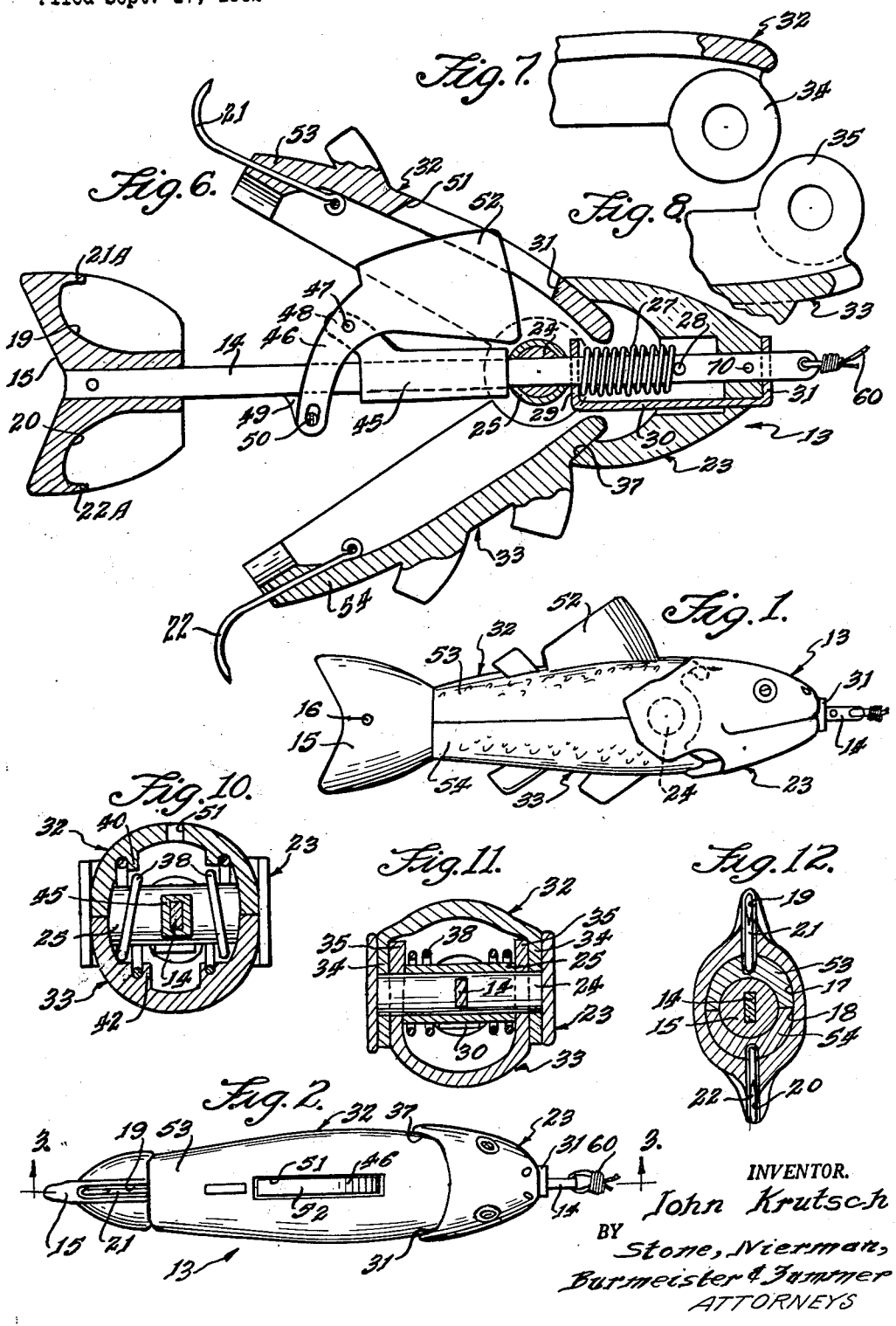

United States Patent Office 3,163,956
Patented Jan. 5, 1965

3,163,956
FISHLURE DEVICE
John Krutsch, 4065 W. Cermak Road, Chicago, Ill.
Filed Sept. 17, 1962, Ser. No. 223,902
6 Claims. (Cl. 43—35)

This invention relates to fishing tackle, and more particularly to a fishlure device of the type including hook elements which are normally retracted but which are automatically extended to outwardly projecting positions responsive to the engagement of the lure device by a fish.

Several fishlure devices that function in a somewhat similar manner to the present invention have been developed and are currently in use. Patent No. 2,667,006 to Lehmann, Sr. and Patent No. 2,311,832 to Helfenstein are examples of such devices.

In many of the present devices the hooks are conspicuously visible to the fish, protruding from the vehicular member as to also snare logs, rocks, water vegetation, and the like. Obviously this characteristic is disadvantageous to the fisherman.

In still other devices where the hooks are nested or cradled within the vehicular member, the member is usually made of an unyielding material such as wood or rigid plastic which immediately cautions the fish, upon "bumping" or "striking," that the lure device is an attempted deception and not an animate creature.

Still another negative characteristic of present fishlure devices of the subject type lies in the fact that the fish must actually bite the unyielding light-reflecting hard metallic hooks and springs of the devices to effect a triggering of the hooks. Such contact between the sensitive mouth of the fish and the metallic elements of the lure devices quickly informs the fish of the fisherman's subterfuge; in the case of a "bump" or a "light strike" or a "medium strike," this results in non-triggering, or triggering without a "set" of the hooks within the oral or other cavity of the fish.

A main object of the invention is to provide a novel and improved fishlure device which is simple in construction, which is easy to set up for use, and which is substantially snag-proof so that it will not be fouled or caught by weeds, other vegetation, logs, rocks, or debris.

A further object of the invention is to provide an improved multiple-hook fishlure device which is relatively inexpensive to manufacture, which is lifelike in appearance and in touch or bite to a fish, and which is easy to remove from a fish's mouth after retrieval and landing of the fish.

Still another object of the invention is to provide a fishlure device that will not seriously injure any of the vital organs, such as the gills, of a fish either upon hooking or landing the fish; this object is most significant in cases where an undersize fish or a forbidden species has been hooked and it is mandatory that the fish be released back to the fishing water.

Further objects and advantages of the invention will become apparent from the following description and claims, and from the accompanying drawings, wherein:

FIGURE 1 is a side elevational view of an improved fishlure device constructed in accordance with the present invention, shown set for use;

FIGURE 2 is a top plan view of the fishlure device of FIGURE 1;

FIGURE 3 is an enlarged longitudinal vertical cross-sectional view taken substantially along line 3—3 of FIGURE 2;

FIGURE 4 is a horizontal longitudinal cross-sectional view taken substantially along the line 4—4 of FIGURE 3;

FIGURE 5 is a longitudinal vertical cross-sectional view, similar to FIGURE 3, but showing a trigger lever of the lure device in an operated, i.e. inwardly rotated, position;

FIGURE 6 is a longitudinal vertical cross-sectional view similar to FIGURES 3 and 5, but showing hook members of the lure device in outwardly extended or operating position;

FIGURE 7 is an enlarged fragmentary view, partly in cross-section, of the pivot portion of one of the hook members employed in the fishlure device of FIGURES 1 to 6;

FIGURE 8 is an enlarged longitudinal vertical cross-sectional view taken through a fragmentary portion of the other hook member employed in the fishlure device of FIGURES 1 to 6;

FIGURE 9 is a transverse vertical cross-sectional view taken substantially along the line 9—9 of FIGURE 3;

FIGURE 10 is a transverse vertical cross-sectional view taken substantially along line 10—10 of FIGURE 3, but not including the fin portion;

FIGURE 11 is a transverse vertical cross-sectional view taken substantially along the line 11—11 of FIGURE 3; and FIGURE 12 is a transverse vertical cross-sectional view taken substantially along line 12—12 of FIGURE 3.

The reference numerals employed hereafter correspond to like numerals presented on the attached drawings. The expression "forward" or "forwardly" denotes the direction in which the fishlure device is drawn through the fishing water, whereas "rear" or "rearwardly" denotes a direction opposite thereto. Similar interpretations apply to the expressions "top" and "bottom."

Referring to the drawings, a fishlure device 13 that has been constructed in accordance with the present invention is shown. Fishlure device 13 includes an elongated rigid leader shaft 14 of suitable material, for example, a rod of rectangular cross-section. A tail member 15 simulating a fishtail or caudal fin is secured to the rear end of leader shaft 14 as by a transverse fastening pin 16. Tail member 15 is formed at the forward top and bottom portions thereof with forwardly-facing locking recesses 17 and 18, respectively. Tail member 15 is further formed with top and bottom recesses 19 and 20 adapted to receive fishhook members 21 and 22, respectively, when the fishhook elements are in a retracted or inoperative position. The fishhook members 21 and 22 need not be barbed hooks and are locked in position by abutting flanges or shoulders 21A and 22A, respectively, which are formed on the tail member 15 by the recesses 19 and 20 and which are disposed generally parallel to the leader shaft 14.

A simulated fishhead or head member 23 is slidably mounted on the forward portion of leader shaft 14. Head member 23 is of hollow construction, and transversely secured therein is a transverse shaft 24 provided with an intermediate spacer sleeve 25 disposed therearound at an intermediate portion of the shaft. Leader shaft 14 extends slidably through the midportions of transverse shaft 24 and spacer sleeve 25. A coil spring 27 surrounds leader shaft 14 forwardly of the transverse shaft 24 and sleeve 25 and bears between a transversely-extending abutment pin 28 secured in the leader shaft and bearing flange 29 engaged against sleeve 25. Bearing flange 29 is formed at one end of a longitudinally extending guideplate 30 that extends through the forward wall portion of hollow head 23, the guideplate being provided at the other end thereof with a front flange 31 through which the leading end of leader shaft 14 slidably extends. As will be apparent from FIGURES 3, 4 and 5, coil spring 27 exerts a biasing force on leader shaft 14 through abutment pin 28, which biases the leader shaft in a forward direction with respect to head member 23.

A pair of top and bottom hook members 32 and 33, consisting generally of channeled arms having external configurations simulating the top and bottom portions of a fish's body, are pivoted on opposite end portions of the transverse shaft 24. Top hook member 32 is formed to include generally circular apertured lugs 34, 34 that engage opposite end portions of transverse shaft 24, and bottom hook member 33 is formed to include a pair of generally circular apertured lugs 35, 35 that engage opposite end portions of transverse shaft 24 inwardly of but adjacent to lugs 34, 34 as shown in FIGURE 4. The forward end portions of hook members 32 and 33 are arcuately contoured to be conformably received by arcuately contoured inner peripheral surface portions 37 of head member 23. Surface portions 37 are shaped to allow hook members 32 and 33 to be rotated outwardly to positions such as those illustrated in FIGURE 6, where the surface portions serve as stop means to limit outward rotation of hook members 32 and 33 to the positions illustrated in FIGURE 6. The surfaces of hook members 32 and 33 which engage arcuately contoured inner peripheral surfaces 37 of head member 23 are correspondingly contoured and all of said four surfaces are preferably substantially concentric about the axis of transverse shaft 24. Thus the forward surface portions of hook members 32 and 33 are slidably movable relative to surface portions 37 of head member 23 between the extended and retracted positions of the hook members.

Hook members 32 and 33 are biased toward their outwardly extended positions, i.e. the positions shown in FIGURE 6, respectively by coil springs 38, 38 which surround the end portions of sleeve 25. Springs 38, 38 each have a top end arm 39 which engages a corresponding lug 40 provided on the inside surfaces of top hook member 32, and each of the springs also has a bottom end arm 41 which engages a corresponding lug 42 provided on the inside surfaces of bottom hook member 33; hook members 32 and 33 are thus biased outwardly by springs 38, 38.

As previously mentioned, pointed fishhook elements 21 and 22 are secured to the rear end portions of hook members 32 and 33 and are receivable, respectively, by recesses 19 and 20 provided in tail member 15. As shown in FIGURE 3, fishhook elements 21 and 22 are substantially housed within recesses 19 and 20 when hook members 32 and 33 are in a fully retracted position.

An elongated sleeve member 45 of generally rectangular cross-section is slidably mounted on leader shaft 14 immediately rearward of transverse shaft 24 and sleeve 25, sleeve member 45 normally being in abutment with sleeve 25. A vertical trigger lever 46 is rotatably coupled by pivot pin 47 to an upwardly extending lug 48 formed on the rear end of sleeve member 45. A lower bifurcated end portion of trigger lever 46 is slidably and rotatably coupled to a depending lug 49 formed on leader shaft 14 rearwardly adjacent sleeve member 45. Thus, the lower bifurcated end portion of trigger lever 46 defines a pair of depending parallel arms, said arms each having an oval slot that receives the ends of a transversely extending rivet 50 intermediately journaled in lug 49; thus, leader shaft 14 and lug 49 thereof are received between the depending arms of trigger lever 46 to be movable therewith and thereby. The top portion of trigger lever 46 functions as a release element or fin 52 which extends through top hook member 32 at an elongated slot 51 formed therein; fin 52 may simulate the dorsal or the adipose fin of a fish.

As previously mentioned, coil spring 27 biases leader shaft 14 forwardly with respect to fishhead member 23, thereby biasing tail member 15 forwardly with respect to hook members 32 and 33. Rear end portions 53 and 54 of hook members 32 and 33 are thus lockably engageable in forwardly facing recesses 17 and 18 of tail member 15 in the manner illustrated in FIGURE 3; hook members 32 and 33 in FIGURE 3 are in retracted position with pointed fishhook elements 21 and 22 cradled in top and bottom recesses 19 and 20 of tail member 15. When fin 52 is rotated inwardly, as when a fish seizes the fishlure device, trigger lever 46 moves leader shaft 14 rearwardly with respect to sleeve member 45 which abuts spacer sleeve 25; as leader shaft 14 moves rearwardly, tail member 15 is also moved rearwardly to ultimately disengage from rear end portions 53 and 54 of hook members 32 and 33 as illustrated in FIGURE 5. When hook members 32 and 33 are thus released, biasing coil springs 38, 38 cause the hook members to rotate outwardly to the positions shown in FIGURE 6 thereby exposing pointed fishhook elements 21 and 22. There is sufficient expansive force possessed by coil springs 38, 38 to embed fishhook elements 21 and 22 in the fish's mouth, thus snaring the fish and preventing it from escaping, the fishhook elements remaining in contact with the fish's mouth substantially regardless of position due to the springs.

As shown, a fishing line 60 including a leader may be fastened to the forward end of leader shaft 14 so that fishlure device 13 may be drawn through fishing waters by appropriate movement of the fishing line, thereby simulating the swimming action of live bait.

The various elements of fishlure device 13 may be made of a semirigid material such as hard rubber or polyethylene which have the feel of a living creature to the fish's bite; this is particularly applicable to tail member 15 and fin 52. For structural reasons, fishhead member 23 is preferably of a rigid material, with leader shaft 14, fishhook elements 21 and 22, transverse shaft 24, spacer sleeve 25, coil spring 27, guideplate 30, coil springs 38, 38, and trigger lever 46 being made preferably of rigid noncorrosive material. For best results, hook members 32 and 33 and trigger lever 46 including fin 52 are made of rigid durable material jacketed with a thick soft flexible cover.

The lure is easy to remove from a fish, the exertion of sufficient finger pressure on hook members 32 and 33 in safety pin fashion causing the hook members to become retracted whereupon fishhook elements 21 and 22 may be withdrawn from the fish's mouth. It is thus relatively easy to disengage fishlure device 13 from the fish. The lure may be reset by engaging rear end portions 53 and 54 of hook members 32 and 33 in locking recesses 17 and 18 of tail member 15.

The leader shaft 14 is also provided with a bore 70 located immediately in front of the flange 31 of the guideplate when the hooks are in the retracted position. A pin 72 is inserted into the bore 70 to prevent the hooks from springing from the retracted position when the line is not in use.

While a specific embodiment of an improved fishlure device has been disclosed in the attached drawings and by the foregoing description, it is to be understood that various modifications within the spirit of the invention will occur to those skilled in the fishlure art. Therefore, it is intended that the invention be limited only by the scope of the appended claims.

What is claimed is:

1. A fishlure device comprising an elongated leader shaft, a tail member secured to a rear porton of said leader shaft having a pair of recesses disposed on opposite sides thereof, means in each of said recesses forming a shoulder remote from the leader shaft, a head member slidably mouted on a forward portion of said leader shaft, a transverse shaft secured to said head member and slidably receiving said leader shaft, first spring means biasing said leader shaft forwardly with respect to said head member, a pair of hook members pivoted on said transverse shaft, second spring means biasing said hook members outwardly, each hook member having a portion adapted to engage the shoulder of one of the recesses to hold the hook members in retracted positions, a sleeve member slidably mounted on said leader shaft rearwardly of and adjacent to said transverse shaft, and a trigger lever pivotally coupled to said sleeve member and said leader shaft at spaced points thereof and having a release element projecting away from the leader shaft and beyond the hook members adapted to be engaged by a fish, said trigger lever being pivotal to move the leader shaft rearwardly sufficiently to disengage said hook members from said locking recesses responsive to rotation of said trigger lever toward the leader shaft.

2. A fishlure device comprising an elongated leader shaft, a tail member secured to a rear portion of said leader shaft having a pair of recesses disposed on opposite sides thereof, means in each of said recesses forming a shoulder remote from the leader shaft, a head member slidably mounted on a forward portion of said leader shaft, a transverse shaft secured to said head member and slidably receiving said leader shaft, first spring means biasing said leader shaft forwardly with respect to said head member, a pair of hook members pivoted on said transverse shaft, second spring means biasing said hook members outwardly, each hook member having a portion adapted to engage the shoulder of one of the recesses to hold the hook members in retracted positions, a sleeve member slidably mounted on said leader shaft rearwardly of and adjacent to said transverse shaft, and a trigger lever pivotally coupled to said sleeve member and said leader shaft at spaced points thereof and having a release element projecting through one of said hook members and shaped to simulate a fin adapted to be engaged by a fish, said trigger lever being pivotal to move said leader shaft rearwardly sufficiently to disengage said hook members from said locking recesses responsive to rotation of said trigger lever toward the leader shaft.

3. A fishlure device comprising an elongated leader shaft, a tail member secured to a rear portion of said leader shaft having a pair of recesses disposed on opposite sides thereof, means in each of said recesses forming a shoulder remote from the leader shaft, a hollow head member slidably mounted on a forward portion of said leader shaft, a transverse shaft secured to said hollow head member and slidably receiving said leader shaft, first spring means mounted on the leader shaft and bearing between said transverse shaft and a portion of said leader shaft spaced forwardly therefrom, said first spring means biasing said leader shaft forwardly with respect to said head member, a pair of hook members pivoted on said transverse shaft and including fishhook elements receivable in said tail member when the hook members are in retracted positions, second spring means biasing said hook members outwardly relative to the leader shaft, each of said hook members having portions adapted to engage one of the shoulders of the recesses to hold the hook members in retracted positions, a sleeve member slidably mounted on said leader shaft rearwardly of and adjacent to said transverse shaft, and a trigger lever pivotally coupled to said sleeve member and said leader shaft at spaced points thereof and having a release element passing through one of the hook members and shaped to simulate a fin adapted to be engaged by a fish, said trigger lever being pivotal and being arranged to move said leader shaft rearwardly sufficiently to disengage said hook members from said recesses responsive to rotation of said trigger lever toward the leader shaft.

4. A fish lure device comprising an elongated leader shaft having forward and rearward portions, a tail member secured to the rearward portion of the leader shaft having a fin extending outwardly from the leader shaft, said fin having a recess extending therein confronting the forward portion of the leader shaft and having a shoulder spaced from the leader shaft generally parallel thereto, a head member slidably disposed on a forward portion of the leader shaft, a pin mounted on the head member and disposed normal to the leader shaft in a plane normal to the axis between the recess of the tail member and the leader shaft, a body member pivotally mounted on the pin and adapted to extend between the tail member and the head member on the side of the leader shaft of the recess in the tail member, said body member having a slot therein extending parallel to the leader shaft, a hook extending from the body member and adapted to extend into the recess and engage the shoulder thereof, spring bias means engaging the body member and the leader shaft urging the body member away from the leader shaft, a second spring bias means engaging the leader shaft and the head member urging the head member toward the tail member, and a release element pivotally mounted on the leader shaft between the tail member and the head member and extending through the slot in the body member, said release element engaging the head member and on actuation thereof urging the head member away from the tail member to release the hook of the body member from the tail member.

5. A fish lure device comprising the elements of claim 4 in combination with a sleeve slidably disposed about the leader shaft between the pin and the pivotal connection of the release element to the leader shaft, said sleeve being pivotally connected to the release element at one end and abutting the pin at the other end.

6. A fish lure device comprising the elements of claim 5 wherein the tail member, body member, and head member simulate a fish, and the portion of the release element extending through the slot of the body member simulates the fin of a fish.

References Cited in the file of this patent

UNITED STATES PATENTS

| | | |
|---|---|---|
| 395,480 | Brewster | Jan. 1, 1889 |
| 1,464,387 | Kispaugh | Aug. 7, 1923 |
| 1,994,168 | Boyko | Mar. 12, 1935 |

FOREIGN PATENTS

| | | |
|---|---|---|
| 264,837 | Germany | Oct. 21, 1913 |